Aug. 21, 1962   J. R. DUKES ET AL   3,050,626
MEASURING SYSTEM

Filed March 30, 1959   2 Sheets-Sheet 1

Inventors
JOHN R. DUKES
LUTHER EGGMAN

Inventors
JOHN R. DUKES
LUTHER EGGMAN

United States Patent Office 3,050,626
Patented Aug. 21, 1962

3,050,626
MEASURING SYSTEM
John R. Dukes and Luther Eggman, Columbus, Ohio, assignors to Industrial Nucleonics Corporation, a corporation of Ohio
Filed Mar. 30, 1959, Ser. No. 802,739
1 Claim. (Cl. 250—83.3)

This invention generally relates to a detection system and more specifically to detecting a missing item, carton or container in a sealed case.

In the packaging of products there is in use today both manual and automatic systems to load the cartons or containers into cases. Visual inspection and mechanical interlocks are used to assure that cases are completely filled before sealing. In spite of these precautionary measures, it is well authenticated that occasionally one or more cartons may be missing when the sealed cases are ultimately opened. The frequency of missing cartons is very low, but nevertheless presents an undesirable situation which many manufacturers want to eliminate.

There are presently known several methods to examine how "full" a sealed case is. If the contents are of uniform density (i.e., a constant weight per carton) and if the weight of the packing material is constant, each type of case will have a nominal "standard" weight. Less-than-standard weight per case would then be prima facie evidence of a shortage within the case. However, because of deviations in tare of the packing materials this is not a reliable method to detect missing cartons in all instances.

Another method for examining the contents of a sealed case is to render the case and contents semi-transparent so that inhomogeneities may be detected by visual observation or other means. In X-ray fluoroscopy variation in the mass cross section, i.e., in homogeneity, is detected by visual observations of a fluorescent screen. This has the advantage of providing instant interpretation of observed anomalies but has the disadvantage of requiring a trained observer.

A radiation detection element such as an ionization chamber, a G—M counting tube or a scintillation crystal may be substituted for the fluorescent screen and observer. This approach has the obvious advantage of lending itself to automation. It has the disadvantage that anomalies in radiation flux level must be interpreted in terms of variation in the magnitude of an electrical signal. The feasibility of this procedure will depend on the magnitude of the anomalies resulting from variation in the mass cross section of the case and contents due to normal variation in mass of the products and packing material relative to the anomalies resulting from a missing carton. Thus, it is necessary to analyze possible orientations of the remaining cartons if one or more is missing from an ordered array.

The special instance of a case containing two layers of cartons will serve as an illustration. In each layer the cartons are in an ordered array of distinct rows and columns. A row is herein defined as being formed by adjacent cartons in the direction of transport of the case and a column is formed by adjacent cartons normal to the direction of transport.

Due to manual and automatic handling of the filled cases before they pass through the detector and the misorientations that could be responsible for the original omission of cartons, a "carton-sized" void is highly improbable. For example, the original void resulting from a single missing carton may be partially filled by a shift of cartons within either a column or a row. If the shift occurs within a column, the mass cross section (or total weight of material) of that column remains unchanged, but if the void is filled by a shift within a row (that is, from an adjacent column or columns), the average mass cross section of the column from which the carton is missing, considered as a whole, increases. The smallest deviation from "full case" mass in any column will occur if a single carton is missing and the remaining cartons within the row shift so that the total void space is equally divided between the remaining cartons of the row. In another example a void in one layer may be partially filled by a carton from the same row and column of an adjacent layer.

Contemplation of the geometric considerations involved will quickly show that the observed mass cross section through any portion of a case will be a function of the size of the measured area (cross-sectional area of path of observation) and of the carton arrangement. If the measured area is small enough, a void equivalent to the mass of the missing cartons will be observed regardless of the carton orientations. For example, in a 5-row pack, this is a change of approximately 20% in mass cross section, and for a 6-row pack it is a change of approximately 16%. These changes provide adequate differentiation from probable variations in the mass of packing materials. Thus, the geometric configuration and circuit arrangement of a missing carton detector must be such as to detect the voids due to a missing carton(s) regardless of how the void space is distributed, while at the same time providing differentiation from changes in mass cross section due to other causes.

The present invention teaches a solution to the above requirements by the use of a number of highly collimated nuclear radiation sources and detectors, each with an individual measuring circuit. A number of alternate solutions based on larger measured areas, fewer sources and ganged detectors to reduce the number of measuring circuits are also shown.

It is accordingly an object of the present invention to provide a new and improved detection system.

It is another object of the invention to provide a new and improved detection system particularly adaptable to detecting the absence of missing items, cartons, or containers in a sealed case.

It is a further object of the invention to provude such a detector that is relatively simple in operation and design and readily adaptable to existing manufacturing processes.

Other objects and features of the present invention will become apparent from a reading of the detailed description taken in conjunction with the drawings in which.

Figure 1:
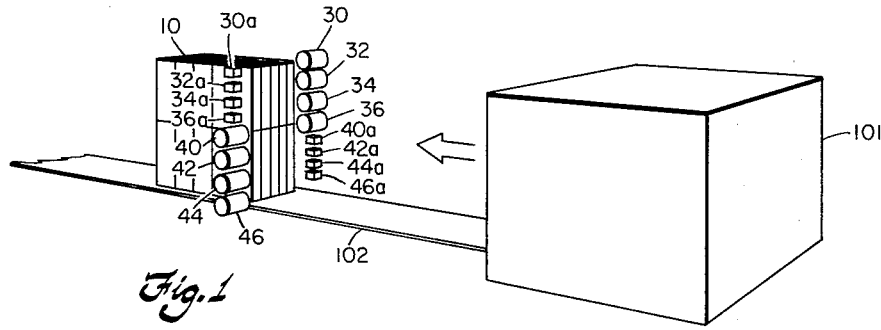
FIG. 1 is a brief schematic showing of an assembly line including the present invention.

Referring now to FIG. 1 there is shown very generally an assembly line 102 adapted to receive sealed cases of cartons from packager 101. Disposed on either side of the conveyor line 102 is a bank or vertical arrangement of detector elements adapted to receive radiation from a corresponding source of radiation on the opposite side of line 102. This is shown by the detectors 30, 32, 34 and 36 positioned to receive radiation from sources 30a, 32a, 34a and 36a, and detectors 40, 42, 44 and 46 positioned to receive radiation from sources 40a, 42a, 44a and 46.

A plurality of radioactive sources each having a corresponding detector system may be considered as an ideal arrangement for detecting any possible void in a sealed case. This arrangement is somewhat impractical because of cost and necessary radiation health requirements. The arrangement in FIG. 2 is therefore intended to illustrate a practical working embodiment of the present invention.

Figure 2:
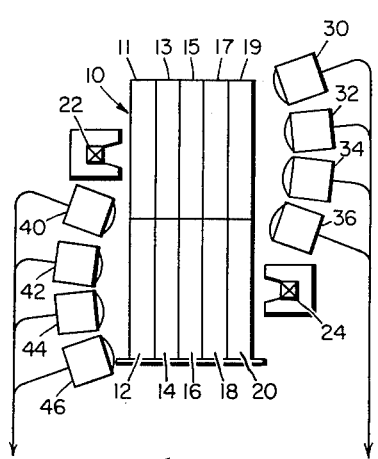
FIG. 2 is a preferred embodiment of the sources and detectors of the present invention.

The embodiment shown in FIG. 2 utilizes a pair of sources each irradiating four ionization chambers arranged to cover a single layer in a two layer case. Case 10 is intended to illustrate a sealed case of two upright layers of long narrow cartons. These cartons are designated as 11, 13, 15, 17 and 19 in the upper layer and in the lower layer as 12, 14, 16, 18 and 20. The dimensions of the detector are dictated by the dimensions and geometrical arrangement of the packed cartons, and of the possible voids that may result when a carton is missing. Detectors 40, 42, 44 and 46 in the embodiment shown in FIG. 2 are positioned relative to the upper layer to receive radiation from source 22. These detectors are shown in a slight semi-circular arrangement in order to equalize the amount of radiation received from the source 22. Similarly source 24 is centrally positioned with respect to the lower layers of cartons and detectors 30, 32, 34 and 36 are positioned about the lower layer to receive radiation from source 24.

Figure 4:
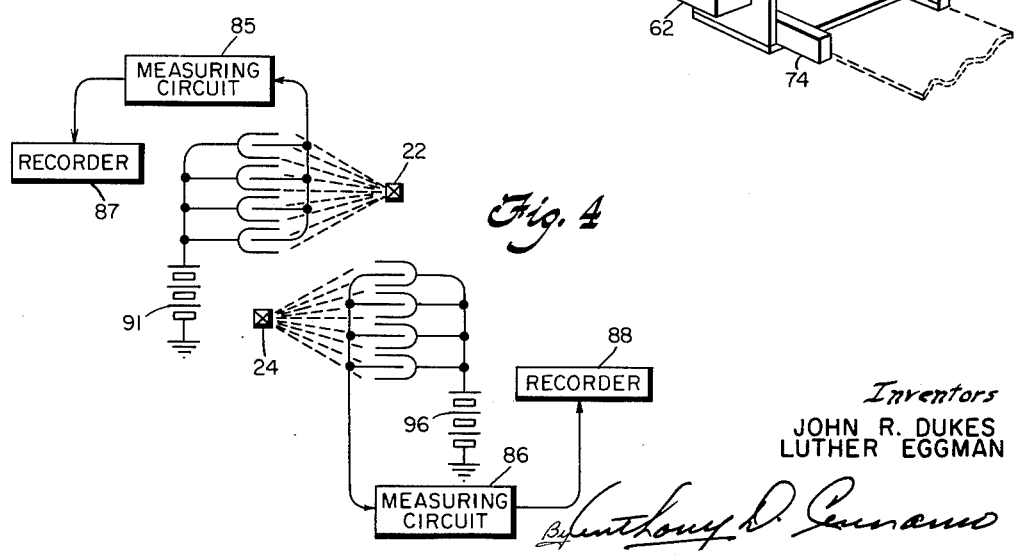
FIG. 4 is an electrical circuit arrangement partly schematic and partly in block diagram for use with the present invention.

The block and schematic diagram in FIG. 4 illustrates a measuring system employing the embodiment of FIG. 2. Power supply 91 and 96 furnishes the collection potential for the detectors. The sum of the two independent signals from the two banks of ionization chambers is used as the input to two measuring circuits 85 and 86 and recording systems 87 and 88, such as that shown and described in U.S. Patent No. 2,790,945 to H. R. Chope for "A Measuring System." With this arrangement the signal representing the absolute mass cross section of the case at the point of measurement is compared to a standard voltage. Inhomogeneities across the case are detected as a change in signal level if the variation in mass cross section is of sufficient magnitude to be resolved.

The usefulness of the system of FIG. 4 depends primarily upon the magnitude of the variations in total mass cross section of the case and contents due to normal variation in the mass of the products and packing material relative to the magnitude of variations in mass cross section resulting from a missing carton. The large fluctuation in the mass of the normal packaging materials within a case causes a low signal-to-noise ratio and consequently limits the usefulness of this system for a missing carton detector. The limitations imposed by the noise bandwidth observed for a single case are severe enough, but it must be assumed that variations in the average mass cross section that can normally be expected to occur between cases on a production line will expand the noise bandwidth for a larger number of cases beyond that observed within a single case. This will degenerate the signal-to-noise ratio even more and may make the problem of differentiating between normal noise and a true "error" signal rather severe.

Figure 3:
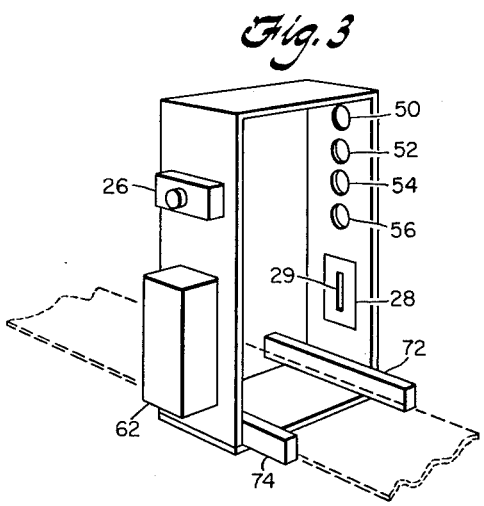
FIG. 3 is a constructed embodiment of the present invention.

The general features of the constructed embodiment shown in FIG. 3 may now be described. The system shown utilizes eight chambers, four in parallel in each of two independent source-detector combinations. The source axes and therefore the position of the source holders and shutters 26 and 28 are separated vertically by one carton length. The distance of the detectors from the source is determined by the cross sectional number of cartons in the case. Heavy collimation is provided by the collimator 29, shown in the source holder 28, to form a fan-shaped radiation pattern from each of the two radioactive sources. This collimation keeps external radiation levels to a minimum. (As a further radiological safety precaution, heavy-duty, lead-filled shutter and source housing assemblies 26 and 28 were used.) The measured area of this source-detector combination is determined by the dimensions of the vertical arrangement of ionization chambers and of the active source area and/or collimator opening.

The ionization chambers were mounted, from the inside, directly on the frame, with the shells extending through the mounting holes 50, 52, 54 and 56 shown for the upper layer. Electrostatic shielding shown singly at 62 was provided for the probes and signal leads by an aluminum housing over the rear of the chambers. Connectors for the chamber polarizing potential and the probe lead connections were mounted on this housing. Each group of four chambers covers the height of one layer of a case and the axes of the two groups are separated by the length of a carton. The two source-detector combinations are alternated, i.e., the sources are on opposite sides of the frame to prevent radiation interference between the two detecting systems. The distance between the source and its associated chambers, i.e., the measuring gap between the source and detector, should be just wide enough to pass the largest case to be inspected. If the gap is greater than this, there will be unnecessary loss of output and electrical sensitivity due to the excessive radiation path. Guides 72 and 74 are operative to center each case as it passes through the measuring area thereby eliminating error signals due to process position and effecting a reduction in the apparent overall system noise.

Figure 5:
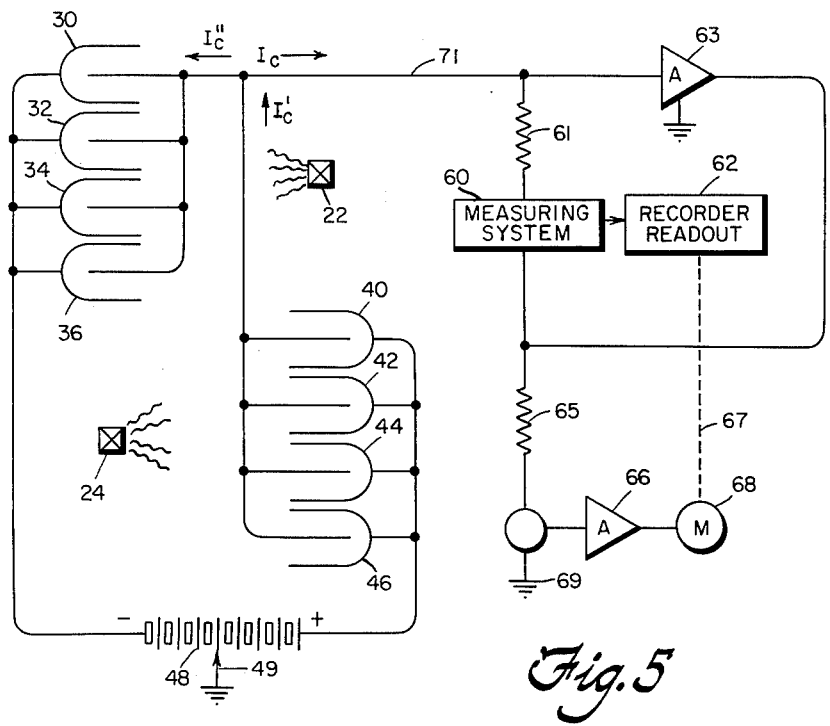
FIG. 5 is a preferred circuit arrangement partly schematic and partly in block diagram for use with the present invention.

Because of the limitations imposed by a measuring system which compares the output signal to a fixed reference, the alternative circuit arrangement and preferred embodiment of FIG. 5 was constructed. Essentially the measuring system of FIG. 5 uses "bucking" ionization chambers to compare radiation attenuation by one layer of a case directly to that by the other layer, rather than against a preset "standard." In this system, mass variations with the same spatial distribution in both layers pass undetected, but anomalies occurring in either layer produce an error signal.

The configuration of FIG. 5 again employs the measuring circuit of the H. R. Chope patent, supra and the source-detector unit described in FIG. 4. A positive polarizing potential from voltage source 48 is applied to one set of four parallel-connected ion chambers 40, 42, 44 and 46 and a negative potential also from source 48 is applied to the other set of four ion chambers 30, 32, 34 and 36. With the chambers polarized in this manner, the output current on line 71 is derived from electron current flow in the other group. These two currents are summed algebraically so that any net current flow causes a voltage drop across the hi-meg resistor 61. The resulting difference signal is the input to a measuring 60 and recording 62 system.

The polarizing potentials for the ionization chambers can be obtained from any convenient source of D.C. energy such as batteries, the preamp power supply in the measuring circuit, or from a simple D.C. power supply. The voltage should be sufficient to operate the ionization chambers on the plateau of their characteristic curves. A high potential is desirable for optimum frequency response.

It is apparent that when the source-detector geometries are balanced and there is identical absorption in both radiation beams the ion current flow and the electron current flow are of equal magnitude and there is no voltage drop across the hi-meg resistor; i.e., the input to the preamplifier 63, FIG. 5, is zero. If because of different source strengths, chamber efficiencies, or geometrical considerations, the ion chamber currents are of different magnitudes when there is no absorber in the radiation beams, a difference voltage will be developed across the hi-meg resistor 61. If identical absorbers are then introduced in each radiation beam, the ratio of the voltage component derived from each source-detector combination will remain constant, but since each is of a lower value than before, the absolute value of the difference will decrease. Thus, a means of balancing the two source-detector systems must be provided to eliminate this artificial error signal. This error may be eliminated by matching the two geometries or by providing compensating voltages to produce identical absorption curves on an absolute voltage scale so that for equal radiation intensities the current flow in the two detector systems are equal and opposite. In this case the difference voltage will be independent of the absolute value of the process weight, and will be influenced only by a difference in the mass absorption in the two radiation paths.

Through common mode signal rejection, the bucking chamber system of FIG. 5 is able to minimize the effects of normal variations in the density and mass of process and packing materials, thereby greatly increasing the signal-to-noise ratio. This not only produces greater sensitivity to changes in the process than is possible with the two independent measuring circuits and reference potentials, but it also permits a narrower control deadband through elimination of the effects of long-term weight variations due to changes in humidity, product variations, and packing materials.

Figure 6:
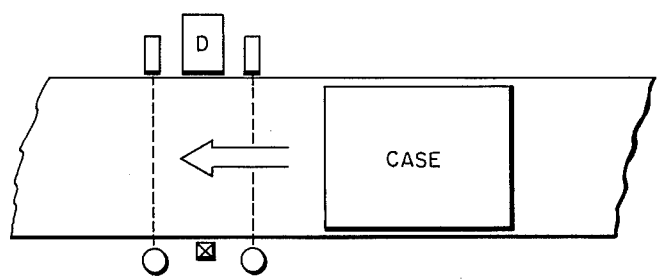
FIG. 6 is a further illustration of the preferred embodiment of the present invention.

In production line use, photocell, or mechanical proximity switching may be required to operate a source shutter and to clamp the gauge between cartons. This provides for radiation safety as well as functional advantages. With a photocell circuit located in line with the front and rear edges of the measuring beam, as illustrated in FIG. 6, the measuring system can be controlled to operate only when both light beams are interrupted. This assures that the detection system will be actuated immediately after the leading edge of the case passes through the measuring area and will be inactivated before the trailing edge of the case passes through. Such action prevents leading and trailing edge signal spikes from actuating the utilization circuit.

Although the preferred embodiment is illustrated as applicable to upper and lower rows of cartons in a case, the invention may readily be adapted to comparing successive rows of cartons. Also although reference is made to rows of cartons, the invention may be equally adaptable to rows having only single cartons. Similarly a rejection system of those known to the art may be added to reject those cases having voids. Therefore, many other modifications may be had from the embodiment shown without departing from the true spirit and scope of the invention.

What is claimed is:

A system for determining a void in a machine packed case having at least two rows of elongated items therein and said rows are one above the other, a plurality of sources of nuclear radiation, means for mounting each of said sources on alternate sides of said rows and at a height approximating the center of a different row of items; a housing for each of said sources having a collimated slot formed therein to permit radiation to emanate from each source in a geometric pattern generally confined to its corresponding row; a plurality of groups of detectors, each of said groups comprising a plurality of detectors stacked one upon the other and of a number corresponding to the height of said elongated row, and said plurality of groups corresponding in number to said plurality of sources; means for mounting each group of detectors on the side of said row opposite to a corresponding one of said sources, each of said groups of detectors providing an electrical output of a magnitude dependent upon the energy impinging thereon, means connecting said groups of detectors is opposition for comparing the electrical energy in said groups and means indicating any difference therebetween.

References Cited in the file of this patent
UNITED STATES PATENTS

| | | |
|---|---|---|
| 2,525,292 | Fua et al. | Oct. 10, 1950 |
| 2,734,136 | Atchison | Feb. 7, 1956 |
| 2,737,592 | Ohmart | Mar. 6, 1956 |
| 2,750,986 | Russell et al. | June 19, 1956 |
| 2,763,790 | Ohmart | Sept. 18, 1956 |
| 2,788,896 | Coleman | Apr. 16, 1957 |